(12) United States Patent
Vosoughi et al.

(10) Patent No.: US 10,904,579 B2
(45) Date of Patent: Jan. 26, 2021

(54) METHOD AND APPARATUS FOR ANNEALING ITERATIVE GEOMETRY SMOOTHING

(71) Applicant: TENCENT AMERICA LLC, Palo Alto, CA (US)

(72) Inventors: Arash Vosoughi, San Jose, CA (US); Sehoon Yea, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/731,448

(22) Filed: Dec. 31, 2019

(65) Prior Publication Data

US 2020/0221133 A1 Jul. 9, 2020

Related U.S. Application Data

(60) Provisional application No. 62/790,443, filed on Jan. 9, 2019.

(51) Int. Cl.

| | |
|---|---|
| *H04N 19/85* | (2014.01) |
| *H04N 19/80* | (2014.01) |
| *H04N 21/4402* | (2011.01) |
| *H04N 21/434* | (2011.01) |

(52) U.S. Cl.
CPC ............. *H04N 19/85* (2014.11); *H04N 19/80* (2014.11); *H04N 21/434* (2013.01); *H04N 21/4402* (2013.01)

(58) Field of Classification Search
CPC ............................... H04N 19/85; H04N 19/80
USPC .................................................... 375/240.29
See application file for complete search history.

(56) References Cited

U.S. PATENT DOCUMENTS

| | | | |
|---|---|---|---|
| 2010/0008424 A1 | 1/2010 | Pace | |
| 2010/0119166 A1* | 5/2010 | Puetter | H04N 19/192 382/233 |
| 2013/0321393 A1* | 12/2013 | Winder | 345/419 |

OTHER PUBLICATIONS

International Search Report in International Application No. PCT/US2020/012298, dated Mar. 11, 2020.
Written Opinion in International Application No. PCT/US2020/012298, dated Mar. 11, 2020.

* cited by examiner

*Primary Examiner* — Amir Shahnami
(74) *Attorney, Agent, or Firm* — Sughrue Mion, PLLC

(57) ABSTRACT

Methods and apparatuses of decoding a video stream encoded using video point cloud coding include obtaining a geometry-reconstructed point cloud; dividing the geometry-reconstructed point cloud into a plurality of cells; obtaining a first reference point including a centroid of a first plurality of points; generating a second plurality of points by applying a first filter to the first plurality of points based on the first reference point; obtaining a second reference point including a centroid of the second plurality of points; generating a third plurality of points by applying a second filter to the second plurality of points based on the second reference point, wherein a strength of the first filter is higher than a strength of the second filter; obtaining a smoothed geometry-reconstructed point cloud based on the third plurality of points; and reconstructing a dynamic point cloud using the smoothed geometry-reconstructed point cloud.

20 Claims, 8 Drawing Sheets

356

352

METHOD AND APPARATUS FOR ANNEALING ITERATIVE GEOMETRY SMOOTHING

CROSS-REFERENCE TO RELATED APPLICATION

This application claims priority from U.S. Provisional Application No. 62/790,443, filed on Jan. 9, 2019, the disclosure of which is incorporated herein by reference in its entirety.

FIELD

This disclosure is directed to a set of advanced video coding technologies, more specifically, video based point cloud compression.

BACKGROUND

Advanced three-dimensional (3D) representations of the world are enabling more immersive forms of interaction and communication. They also allow machines to understand, interpret, and navigate our world. Point clouds have been widely used as a 3D representation of the world. Several use cases associated with point cloud data have been identified, and some corresponding requirements for point cloud representation and compression have been developed.

A point cloud may be a set of points in a 3D space, each with associated attributes, e.g. color, material properties, etc. Point clouds can be used to reconstruct an object or a scene as a composition of such points. They can be captured using multiple cameras and depth sensors in various setups and may be made up of thousands up to billions of points in order to realistically represent reconstructed scenes.

Compression technologies are needed to reduce the amount of data required to represent a point cloud. As such, technologies may be needed for lossy compression of point clouds for use in real-time communications and six Degrees of Freedom (DoF) virtual reality. In addition, technology is sought for lossless point cloud compression in the context of dynamic mapping for autonomous driving and cultural heritage applications, etc. MPEG has started working on a standard to address compression of geometry and attributes such as colors and reflectance, scalable/progressive coding, coding of sequences of point clouds captured over time, and random access to subsets of the point cloud.

SUMMARY

In an embodiment, method of decoding a video stream encoded using video point cloud coding, the method is performed by at least one processor and includes obtaining a geometry-reconstructed point cloud; dividing the geometry-reconstructed point cloud into a plurality of cells, wherein a cell of the plurality of cells includes a first plurality of points; obtaining, from among the first plurality of points, a first reference point including a centroid of the first plurality of points; generating a second plurality of points by applying a first filter to the first plurality of points based on the first reference point; obtaining, from among the second plurality of points, a second reference point including a centroid of the second plurality of points; generating a third plurality of points by applying a second filter to the second plurality of points based on the second reference point, wherein a strength of the first filter is higher than a strength of the second filter; obtaining a smoothed geometry-reconstructed point cloud based on the third plurality of points; and reconstructing a dynamic point cloud using the smoothed geometry-reconstructed point cloud.'

In an embodiment, an apparatus for decoding a video stream encoded using video point cloud coding includes at least one memory configured to store program code; and at least one processor configured to read the program code and operate as instructed by the program code, the program code including: first obtaining code configured to cause the at least one processor to obtain a geometry-reconstructed point cloud; dividing code configured to cause the at least one processor to divide the geometry-reconstructed point cloud into a plurality of cells, wherein a cell of the plurality of cells includes a first plurality of points; second obtaining code configured to cause the at least one processor to obtain, from among the first plurality of points, a first reference point including a centroid of the first plurality of points; first generating code configured to cause the at least one processor to generate a second plurality of points by applying a first filter to the first plurality of points based on the first reference point; third obtaining code configured to cause the at least one processor to obtain, from among the second plurality of points, a second reference point including a centroid of the second plurality of points; second generating code configured to cause the at least one processor to generate a third plurality of points by applying a second filter to the second plurality of points based on the second reference point; fourth obtaining code configured to cause the at least one processor to obtain a smoothed geometry-reconstructed point cloud based on the third plurality of points; and reconstructing code configured to cause the at least one processor to reconstruct a dynamic point cloud using the smoothed geometry-reconstructed point cloud, wherein a strength of the first filter is higher than a strength of the second filter.

In an embodiment, a non-transitory computer-readable medium stores computer instructions decoding a video stream encoded using video point cloud coding that, when executed by at least one processor, cause the at least one processor to: obtain a geometry-reconstructed point cloud; divide the geometry-reconstructed point cloud into a plurality of cells, wherein a cell of the plurality of cells includes a first plurality of points; obtain, from among the first plurality of points, a first reference point including a centroid of the first plurality of points; generate a second plurality of points by applying a first filter to the first plurality of points based on the first reference point; obtain, from among the second plurality of points, a second reference point including a centroid of the second plurality of points; generate a third plurality of points by applying a second filter to the second plurality of points based on the second reference point; obtain a smoothed geometry-reconstructed point cloud based on the third plurality of points; and reconstruct a dynamic point cloud using the smoothed geometry-reconstructed point cloud, wherein a strength of the first filter is higher than a strength of the second filter.'

BRIEF DESCRIPTION OF THE DRAWINGS

Further features, the nature, and various advantages of the disclosed subject matter will be more apparent from the following detailed description and the accompanying drawings in which.

DETAILED DESCRIPTION

A consideration behind video-based point cloud compression (V-PCC) is to leverage existing video codecs to compress the geometry, occupancy, and texture of a dynamic point cloud as three separate video sequences. The extra metadata needed to interpret the three video sequences may be compressed separately. A small portion of the overall bitstream is the metadata, which could be encoded/decoded efficiently using software implementation. The bulk of the information may be handled by the video codec.

Embodiments of the present disclosure relate to an annealing iterative geometry smoothing to avoid over-smoothing in an iterative smoothing framework. Embodiments of the present disclosure relate to using a combination of average and median statistics to derive the reference points aiming to reduce the computational complexity of using the pure median.

With reference to FIGS. 1-4, an embodiment of the present disclosure for implementing encoding and decoding structures of the present disclosure are described. The encoding and decoding structures of the present disclosure may implement aspects of V-PCC described above.

Figure 1:
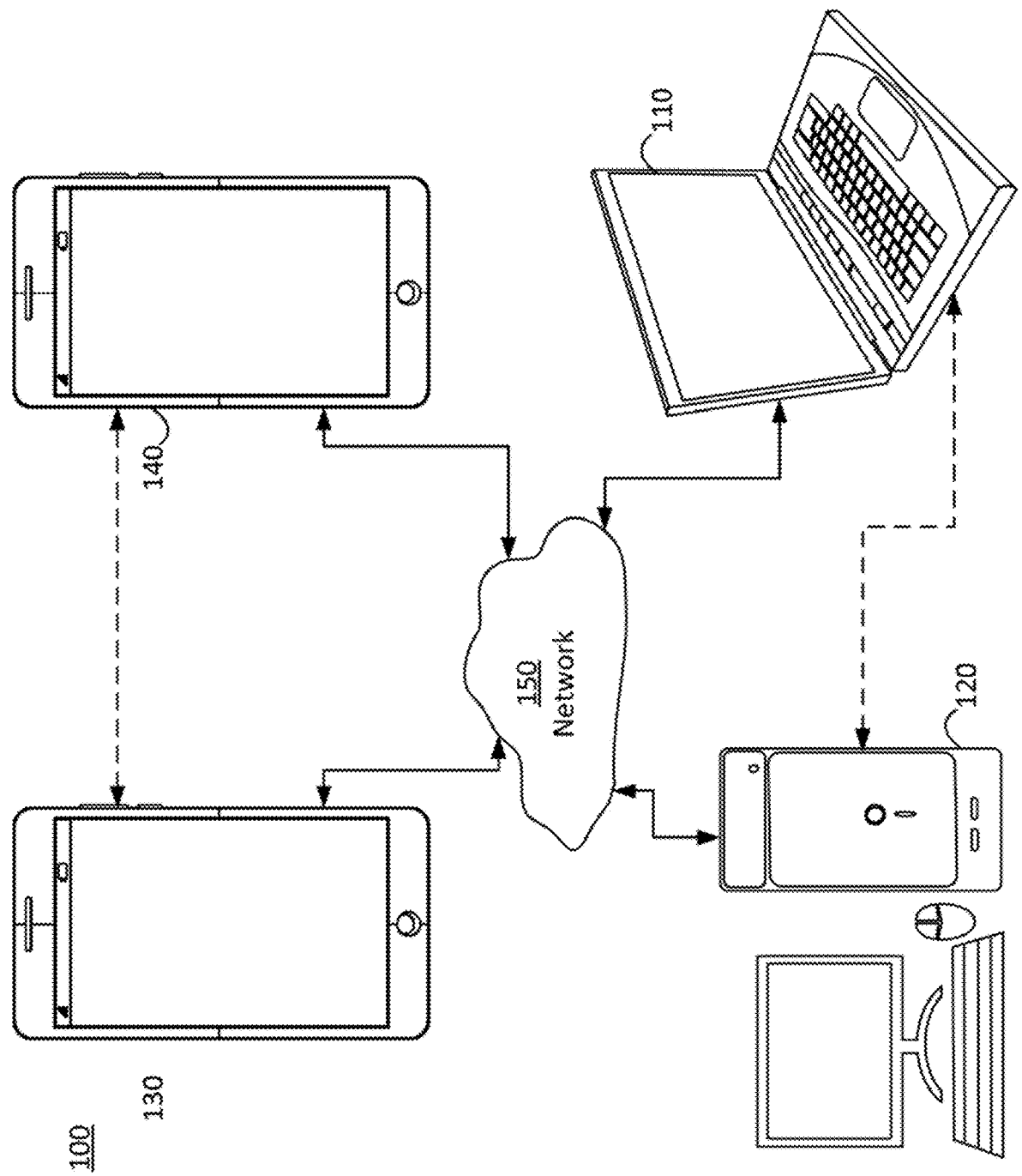
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
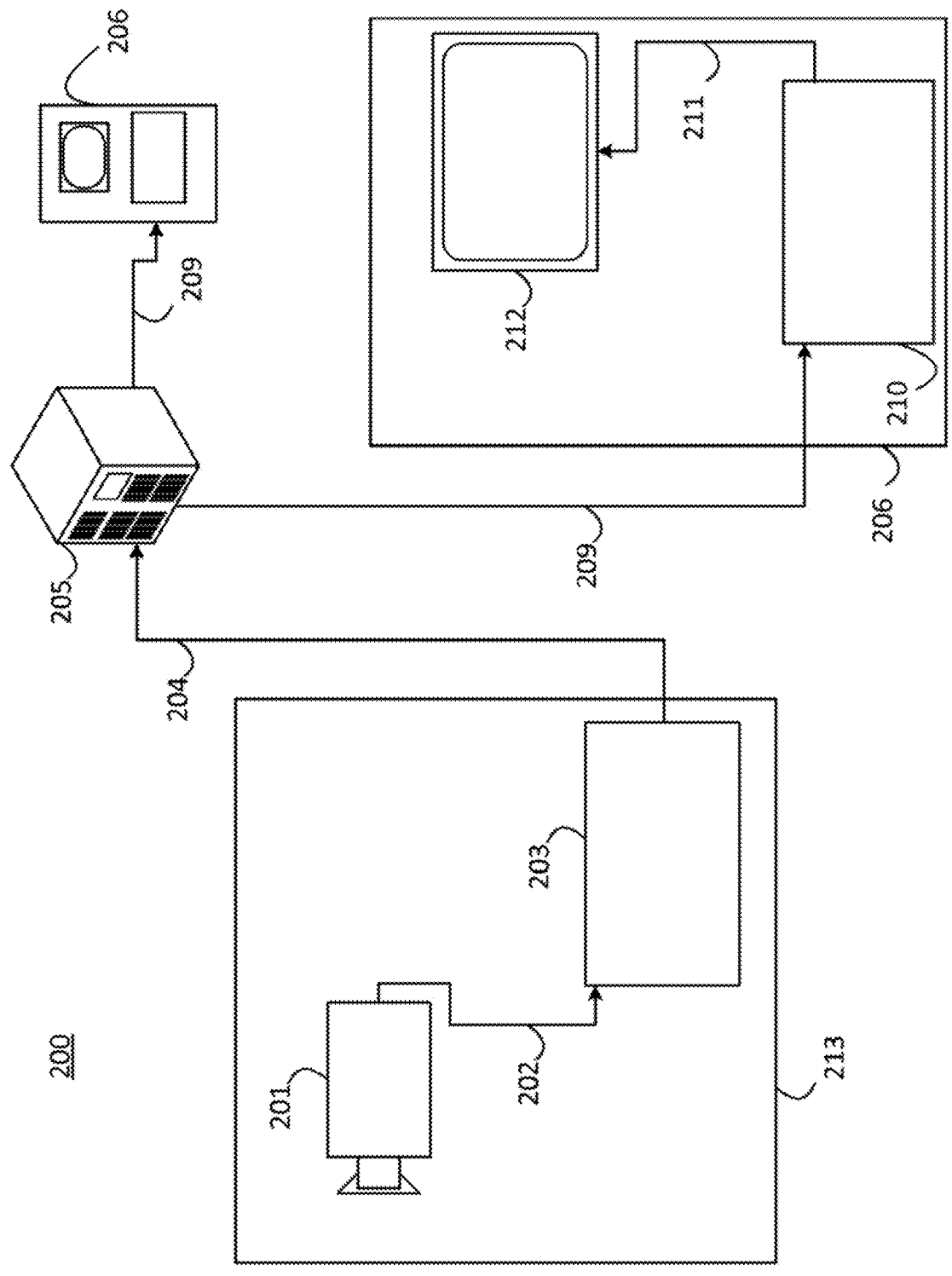
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D point cloud corresponding to a 3D video. The video source 201 may include, for example, 3D sensors (e.g. depth sensors) or 3D imaging technology (e.g. digital camera(s)), and a computing device that is configured to generate the 3D point cloud using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265, Versatile Video Coding (VVC), and MPEG/V-PCC.

Figure 3:
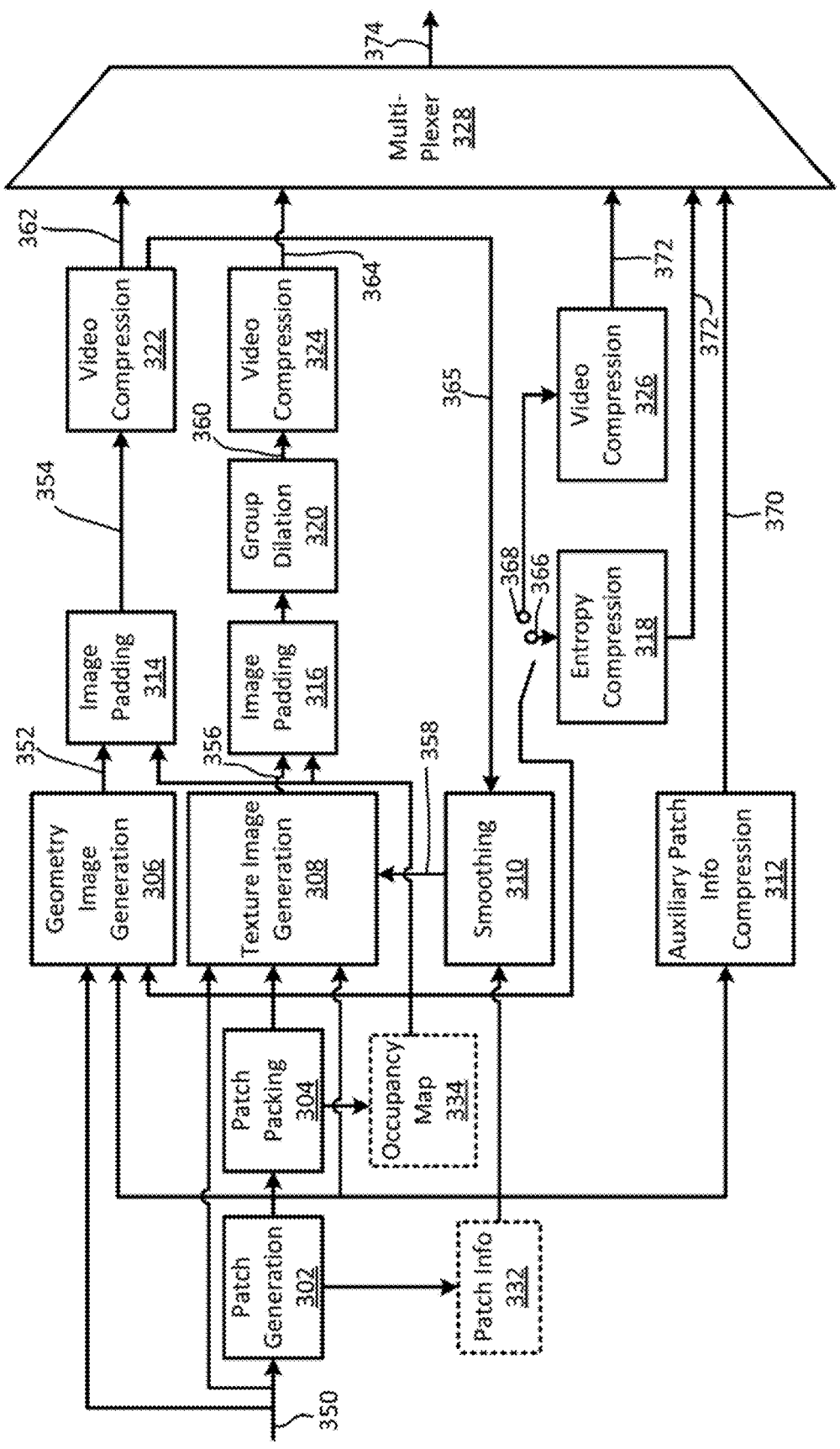
FIG. 3 is a schematic illustration of a simplified block diagram of a video encoder in accordance with an embodiment.
Figure 4:
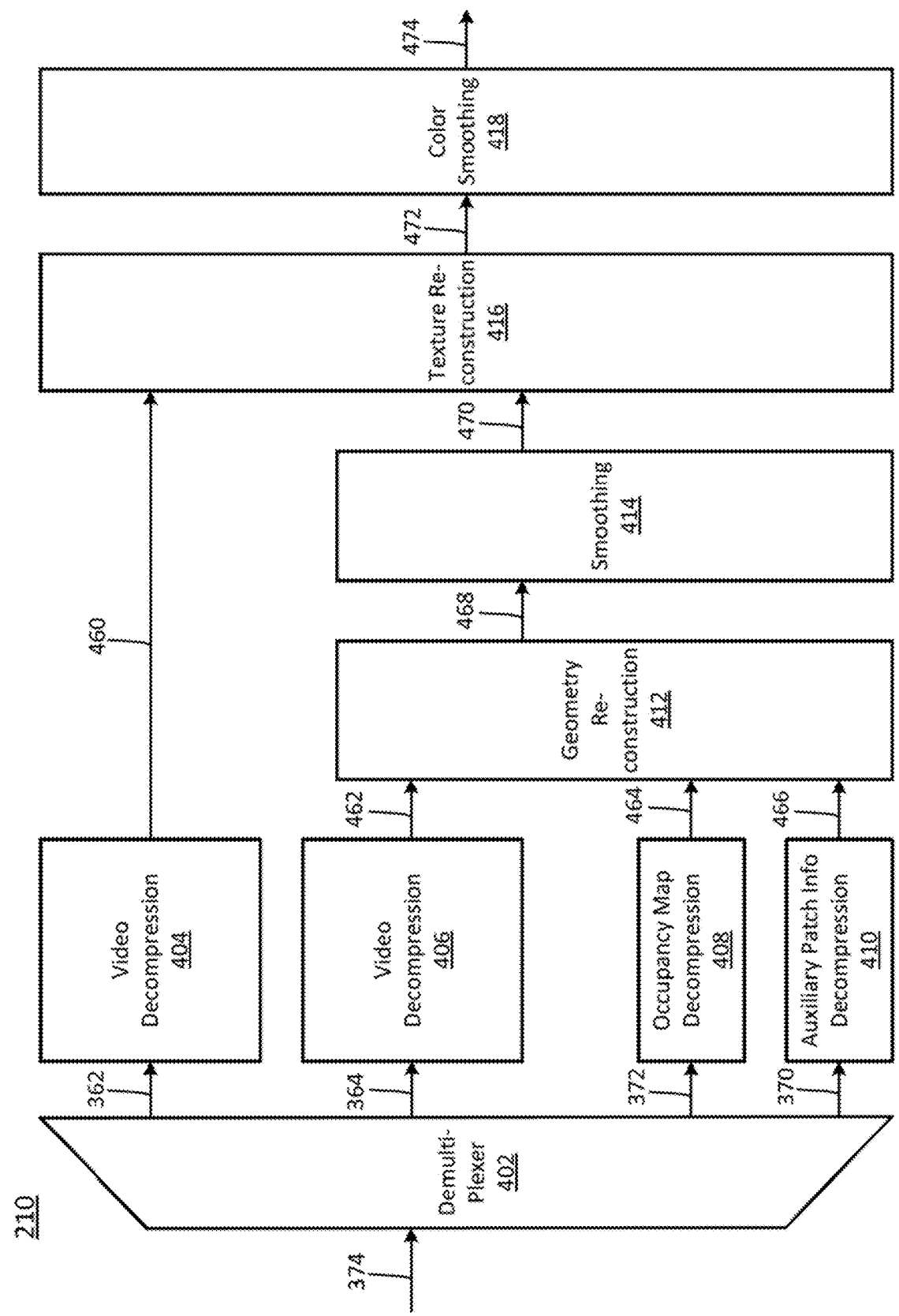
FIG. 4 is a schematic illustration of a simplified block diagram of a video decoder in accordance with an embodiment.

With reference to FIGS. 3-4, some aspects of V-PCC that may be performed by embodiments of the present disclosure are described below.

FIG. 3 illustrates an example functional block diagram of a video encoder 203 according to an embodiment of the present disclosure.

As illustrated in FIG. 3, the video encoder 203 may receive a point cloud frame(s) 350, and generate a geometry image 352, a texture image 356, and an occupancy map 334 based on the point cloud frame 350. The video encoder 203 may compress the geometry image 352 into a compressed geometry image 362, the texture image 356 into a compressed texture image 364, and the occupancy map 334 into a compressed occupancy map 372. A multiplexer 328 of the video encoder 203 may form a compressed bitstream 374 that includes the compressed geometry image 362, the compressed texture image 364, and the compressed occupancy map 372.

More specifically, in embodiments, the video encoder 203 may include a patch generation module 302 that segments the point cloud frame 350 into patches. Patches are useful entities of V-PCC. The patch generation process includes decomposing the point cloud frame 350 into a minimum number of patches with smooth boundaries, while also minimizing the reconstruction error. Encoders of the present disclosure may implement various methods to generate such a decomposition.

The video encoder 203 may include a patch packing module 304 that performs a packing process. The packing process includes mapping the extracted patches onto a 2D grid while minimizing the unused space and guaranteeing that every M×M (e.g., 16×16) block of the grid is associated with a unique patch. Efficient patch packing directly impacts the compression efficiency either by minimizing the unused space or ensuring temporal consistency. The patch packing module 304 may generate the occupancy map 334.

The video encoder 203 may include a geometry image generation module 306 and a texture image generation module 308. In order to better handle the case of multiple points being projected to the same sample, each patch may be projected onto two images, referred to as layers. For example, the geometry image generation module 306 and the texture image generation module 308 may exploit the 3D to 2D mapping computed during the packing process of the patch packing module 304 to store the geometry and texture of the point cloud as images (a.k.a. layers). The generated images/layers may be stored as a video frame(s) and compressed using a video codec (e.g. HM video codec) according to configurations provided as parameters.

Figure 6:
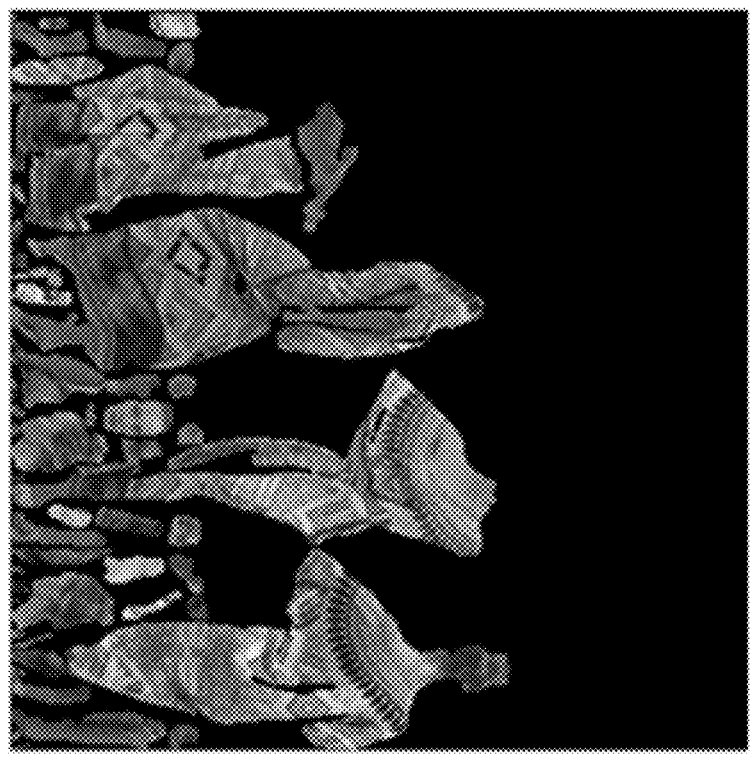
FIG. 6 illustrates an example of a texture image in accordance with an embodiment.
Figure 5:
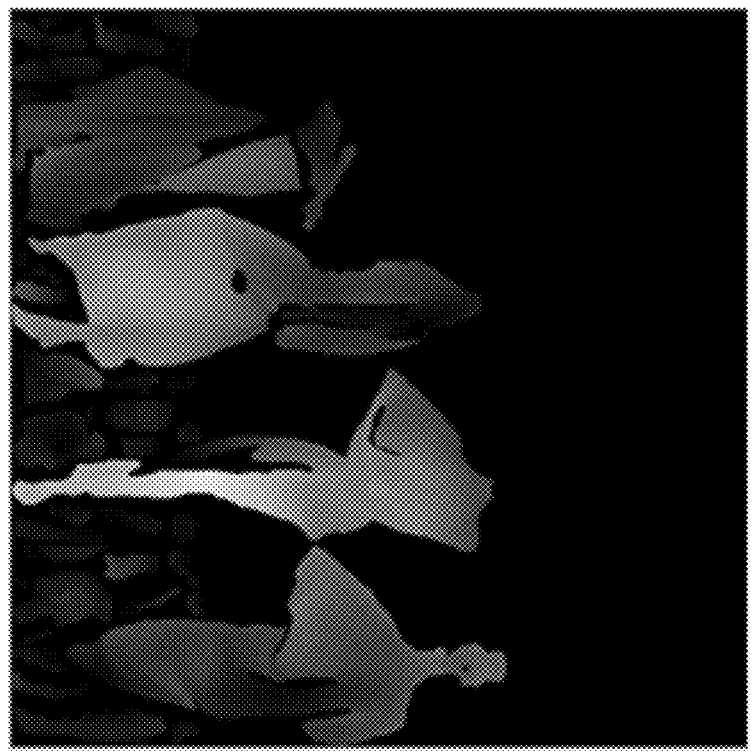
FIG. 5 illustrates an example of a geometry image in accordance with an embodiment.

In embodiments, the geometry image generation module 306 generates the geometry image 352 and the texture image generation module 308 generates the texture image 356, based on the input point cloud frame 350 and the occupancy map 334. An example of the geometry image 352 is illustrated in FIG. 5 and an example of the texture image 356 is illustrated in FIG. 6. In an embodiment, the geometry image 352 may be represented by a monochromatic frame of W×H in YUV420-8 bit format. In an embodiment, the occupancy map 334 image consists of a binary map that indicates for each cell of the grid whether it belongs to the empty space or to the point cloud. To generate the texture image 356, the texture image generation module 308 may exploit the reconstructed/smoothed geometry 358 in order to compute the colors to be associated with the re-sampled points.

The video encoder 203 may also include an image padding module 314 and an image padding module 316 for padding the geometry image 352 and the texture image 356, respectively, to form a padded geometry image 354 and a padded texture image 360. The image padding (a.k.a. background filling) simply fills unused space of the images with redundant information. A good background filling is a one that minimally increases the bit rate while does not introduce significant coding distortion around the patch boundaries. The image padding module 314 and the image padding module 316 may use the occupancy map 334 to form the padded geometry image 354 and the padded texture image 360, respectively. In an embodiment, the video encoder 203 may include a group dilation module 320 to form the padded texture image 360.

The video encoder 203 may include a video compression module 322 and a video compression module 324 for compressing the padded geometry image 354 and the padded texture image 360 into the compressed geometry image 362 and the compressed texture image 364, respectively.

The video encoder 203 may include an entropy compression module 318 for lossless encoding 366 of the occupancy map 334 and a video compression module 326 for lossy encoding 368 of the occupancy map 334.

In embodiments, the video encoder 203 may include a smoothing module 310 for generating smoothed geometry 358 by using a reconstructed geometry image 365, provided by the video compression module 322, and patch info 332. The smoothing procedure of the smoothing module 310 may aim at alleviating potential discontinuities that may arise at the patch boundaries due to compression artifacts. The smoothed geometry 358 may be used by the texture image generation module 308 to generate the texture image 356.

The video encoder 203 may also include an auxiliary patch information compression module 312 for forming compressed auxiliary patch information 370 that is provided in the compressed bitstream 374 by the multiplexer 328.

FIG. 4 illustrates an example functional block diagram of a video decoder 210 according to an embodiment of the present disclosure.

As illustrated in FIG. 4, the video decoder 210 may receive the coded bitstream 374 from the video encoder 203 to obtain the compressed texture image 362, the compressed geometry image 364, the compressed occupancy map 372, and the compressed auxiliary patch information 370. The video decoder 210 may decode the compressed texture image 362, the compressed geometry image 364, the compressed occupancy map 372, and the compressed auxiliary patch information 370 to obtain a decompressed texture image 460, a decompressed geometry image 462, a decompressed occupancy map 464, and decompressed auxiliary patch information 466, respectively. Following, the video decoder 210 may generate a reconstructed point cloud 474 based on the decompressed texture image 460, the decompressed geometry image 462, the decompressed occupancy map 464, and the decompressed auxiliary patch information 466.

In embodiments, the video decoder 210 may include a demultiplexer 402 that separates the compressed texture image 362, the compressed geometry image 364, the compressed occupancy map 372, and the compressed auxiliary patch information 370 of the compressed bitstream 374 received.

The video decoder 210 may include a video decompression module 404, a video decompression module 406, an occupancy map decompression module 408, and an auxiliary patch information decompression module 410 that decode the compressed texture image 362, the compressed geometry image 364, the compressed occupancy map 372, and the compressed auxiliary patch information 370, respectively.

The video decoder 210 may include a geometry reconstruction module 412 that obtains reconstructed (three dimensional) geometry 468 based on the decompressed geometry image 462, the decompressed occupancy map 464, and the decompressed auxiliary patch information 466.

The video decoder 210 may include a smoothing module 414 that smooths the reconstructed geometry 468 to obtain smoothed geometry 470. The smoothing procedure may aim at alleviating potential discontinuities that may arise at the patch boundaries due to compression artifacts.

The video decoder 210 may include a texture reconstruction module 416 for obtaining reconstructed texture 472 based on the decompressed texture image 460 and the smoothed geometry 470.

The video decoder 210 may include a color smoothing module 418 that smooths the color of the reconstructed texture 472 to obtain a reconstructed point cloud 474. Non-neighboring patches in 3D space are often packed next to each other in 2D videos. This implies that pixel values from non-neighboring patches might be mixed up by the block-based video codec. The color smoothing of the color smoothing module 418 may aim to reduce the visible artifacts that appear at patch boundaries.

After compression of geometry video, the point cloud may be reconstructed using the compressed geometry video and the corresponding occupancy map, which may also be referred to as a geometry-reconstructed cloud. Colors may be then transferred to the resulting geometry-reconstructed cloud. Geometry smoothing may be applied on the geometry-reconstructed cloud before color-transfer.

A goal of geometry smoothing may be to recover the geometry distorted at patch boundaries which is due to geometry compression as well as conversion of a high-resolution occupancy map to a lower-resolution one. A better smoothing strategy could lead to a better geometry-reconstructed cloud which in turn leads to a higher-quality compressed texture-video.

Embodiments of the present disclosure relate to an annealing strategy to decay the strength of smoothing when the number of iterations increase in order to avoid over-smoothing when multiple smoothing iterations are performed. This approach may be independent of the type of the interpolation filter adopted, for example a trilinear filter. Also, to derive the reference points, embodiments of the present disclosure may use a combination of median and average statistics to reduce the computational complexity compared to the case where the pure median is used.

According to an embodiment, a process of geometry smoothing of V-PCC may include two steps:
1—Compute a set of reference points, where each reference point is computed as the centroid of points in a cell, for example a 2×2×2 cell.
2—Apply an interpolation filter, for example a trilinear filter, to all the points using the references points computed in step 1.

According to an embodiment, in an iterative smoothing framework, each of the above steps or both could be done differently in each iteration. Embodiments of the present disclosure relate to an annealing iterative smoothing approach to avoid over-smoothing incurred by step 2, where the strength of the interpolation filter is reduced in each iteration.

Embodiments of the present disclosure also relate to using a combination of median and average statistics to derive the reference points in step 1 aiming to reduce the computational complexity of computing the pure median.

In an embodiment, the strength of the interpolation filter may be decayed in an annealing fashion to avoid over-smoothing. Assume the current point p is moved to p by the trilinear filter (i.e., the interpolation filter) as shown in Equation 1 below:

$$p \xrightarrow{move\ to} \tilde{p} \quad \text{(Equation 1)}$$

For the second iteration, a partial movement may be used to avoid over-smoothing:

$$p \xrightarrow{move\ to} w \cdot \tilde{p} + (1-w) \cdot p \quad \text{(Equation 2)}$$

Where w is a filter weight. For example, w=0.5 may be used. T

The proposed partial movement may be used regardless of the type of filter and, and may be used for filter other than trilinear filter. In an embodiment, if the number of iterations is larger than 2, an annealing strategy may be adopted such that the value of w is decreased in each iteration. Any usual annealing approach could be used including the ones used in gradient descent optimization techniques. Examples are illustrated in Equations 3 and 4 below:

$$p \xrightarrow{move\ to} \alpha_0 e^{-\beta_0 k} \cdot \tilde{p} + (1 - \alpha_0 e^{-\beta_0 k}) \cdot p \quad \text{(Equation 3)}$$

$$p \xrightarrow{move\ to} \frac{\alpha_0}{1+\beta_0 k} \cdot \tilde{p} + \left(1 - \frac{\alpha_0}{1+\beta_0 k}\right) \cdot p \quad \text{(Equation 4)}$$

Wherein p represents a location of a reference point, $\tilde{p}$ represents a location of the reference point after an interpolation filter is applied, $\alpha 0$ represents a first constant, $\beta 0$ represents a second constant, and k represents an iteration number. For example, k=1 may be used for the first iteration, k=2 may be used for the first iteration, and k=3 may be used for the first iteration.

In one embodiment, he computational complexity of the iterative smoothing may be reduced if a highly complex reference point computation is utilized, for example if vector median is used in place of average. In that case, a threshold may be chosen for the number of points of each cell, N. This threshold may be denoted by T. The complex reference computation may be applied if N≤T, and the average filter may be applied otherwise. The computational complexity is increased slightly compared to the average filter if T is set to a number around 50.

In another embodiment, duplicate points are removed from a cell before computing its corresponding reference point. This means that, as an example, the centroid (average) is computed as shown in Equation 5 below:

$$c = \frac{\Sigma_{p_i \in Q} p_i}{|Q|} \quad \text{(Equation 5)}$$

where Q represents the set of current cell unique points and |Q| denotes the cardinality of set Q. and pi represents a point having an index i.

An example of a metadata syntax for signaling the embodiments discussed above is shown in Table 1 below:

TABLE 1

| | Descriptor |
|---|---|
| iterative_smoothing_metadata( ) { | |
|   if(iterative_smoothing_enabled_flag) { | |
|     iterative_smoothing_present_flag | u(1) |
|     if(iterative_smoothing_present_flag) { | |
|       number_of_iterations | u(8) |

TABLE 1-continued

|  | Descriptor |
|---|---|
| weight_annealing_strategy | u(8) |
| weight_annealing_param_alpha0 | f(32) |
| weight_annealing_param_beta0 | f(32) |
| for(i = 0; i < number_of_iterations; ++i) { | |
|     reference_point_type_index_per_iteration[ i ] | u(8) |
| interpolation_filter_type_index_per_iteration[ i ] | u(8) |
|     } | |
|   } | |
| } | |

In Table 1 above, iterative smoothing_present_flag may indicate whether iterative smoothing is used or not.

number_of_iterations may indicate the number of times the smoothing process is applied sequentially.

reference_point_type_index_per_iteration[i] may indicate the index of the type of the reference point used in the i-th iteration. Examples include average and vector median. The value of reference_point_type_index_per_iteration[i] may be in the range [0, number_of_available_reference_point_types−1].

interpolation_filter_type_index_per_iteration[i] may indicate the index of the type of the interpoloation (smoothing) filter used in the i-th iteration. The value of interpolation_filter_type_index_per_iteration[i] may be in the range [0, number_of_available_interpolation_filter_types−1]. Examples include trilinear and weighted trilinear.

An example decoding process may take as inputs Indexes of types of reference points in each iteration, indexes of types of interpolation filters in each iteration, and parameters of the decaying weights. A decoder, for example decoder 210, may sequentially apply the smoothing filters so that the input at the i-th iteration filter is the output of the (i−1)-th filter. Reference points at iteration i may be computed according to the value of reference_point_type_index_per_iteration[i]. Interpolation may then be done at iteration i according to the value of interpolation_filter_type_index_per_iteration[i]. Results of the interpolation may be weighted according to the values of weight_annealing_strategy[i], weight_annealing_param_alpha0[i] and weight_annealing_param_beta0[i].

Figure 7:
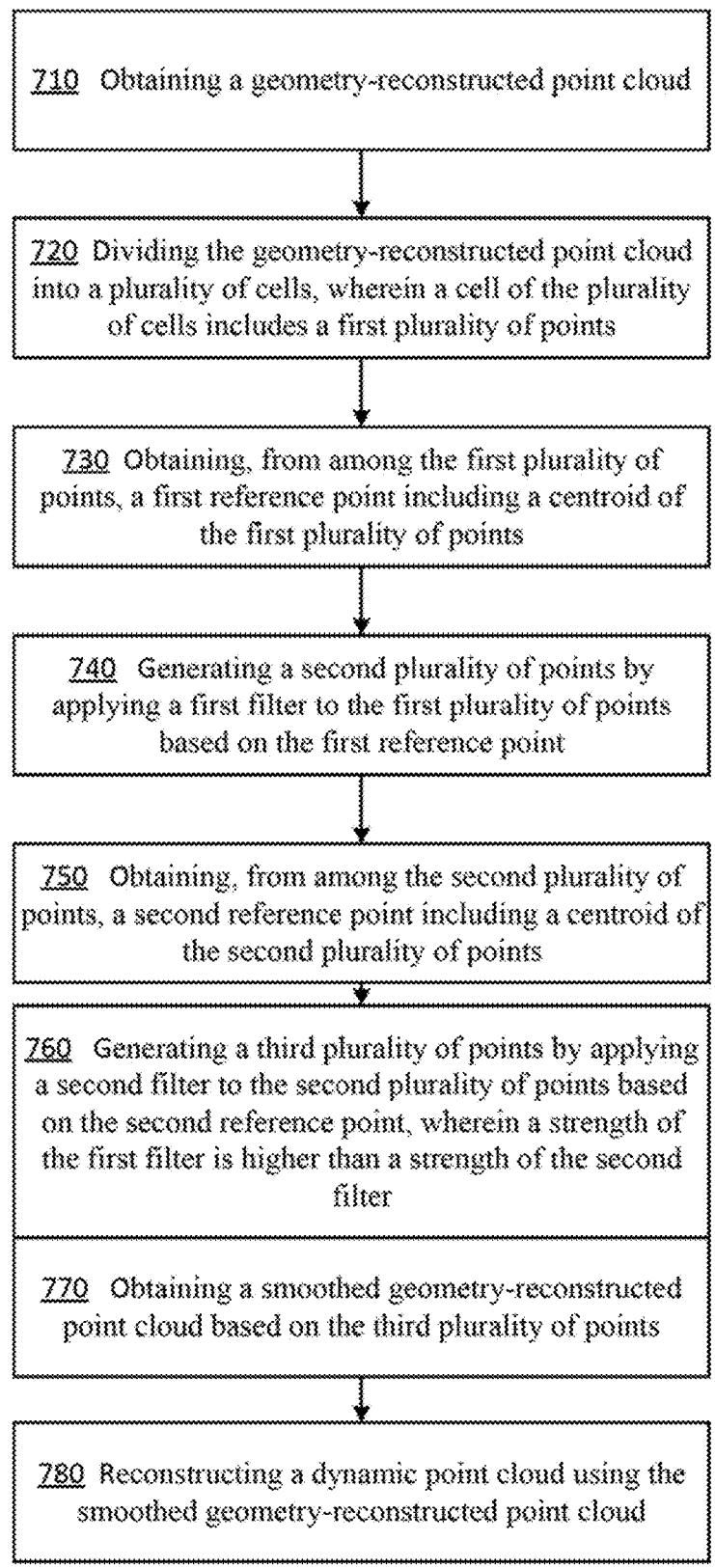
FIG. 7 is a flow diagram illustrating a process performed by an embodiment.

FIG. 7 is a flowchart of a method 700 of decoding a video stream encoded using video point cloud coding which may include annealing iterative geometry smoothing, according to embodiments. In some implementations, one or more process blocks of FIG. 7 may be performed by decoder 210. In some implementations, one or more process blocks of FIG. 7 may be performed by another device or a group of devices separate from or including the encoder 203, such as the encoder 203.

As shown in FIG. 7, in operation 710, the method 700 may include obtaining a geometry-reconstructed point cloud.

In operation 720, the method 700 may include dividing the geometry-reconstructed point cloud into a plurality of cells, wherein a cell of the plurality of cells includes a first plurality of points.

In operation 730, the method 700 may include obtaining, from among the first plurality of points, a first reference point including a centroid of the first plurality of points.

In operation 740, the method 700 may include generating a second plurality of points by applying a first filter to the first plurality of points based on the first reference point.

In operation 750, the method 700 may include obtaining, from among the second plurality of points, a second reference point including a centroid of the second plurality of points.

In operation 760, the method 700 may include generating a third plurality of points by applying a second filter to the second plurality of points based on the second reference point, wherein a strength of the first filter is higher than a strength of the second filter.

In operation 770, the method 700 may include obtaining a smoothed geometry-reconstructed point cloud based on the third plurality of points.

In operation 780, the method 700 may include reconstructing a dynamic point cloud using the smoothed geometry-reconstructed point cloud.

In an embodiment, the first filter includes a first trilinear filter, and the second filter includes a second trilinear filter.

In an embodiment, the method may further include obtaining, from among the third plurality of points, a third reference point comprising a centroid of the third plurality of points; generating a fourth plurality of points by applying a third filter to the third plurality of points based on the third reference point; generating the smoothed geometry-reconstructed point cloud based on the fourth plurality of points.

In an embodiment, the method may further include comparing a number of the first plurality of points to a threshold value. Based on the number being lower than a threshold value, the centroid of the first plurality of points may be determined using a vector median of the first plurality of points. Based on the number being higher than the threshold value, the centroid of the first plurality of points may be determined using an average filter.

In an embodiment, duplicate points may be removed from the first plurality of points before the first reference point is determined.

Although FIG. 7 shows example blocks of the method 700, in some implementations, the method 700 may include additional blocks, fewer blocks, different blocks, or differently arranged blocks than those depicted in FIG. 7 Additionally, or alternatively, two or more of the blocks of the method 700 may be performed in parallel.

Figure 8:
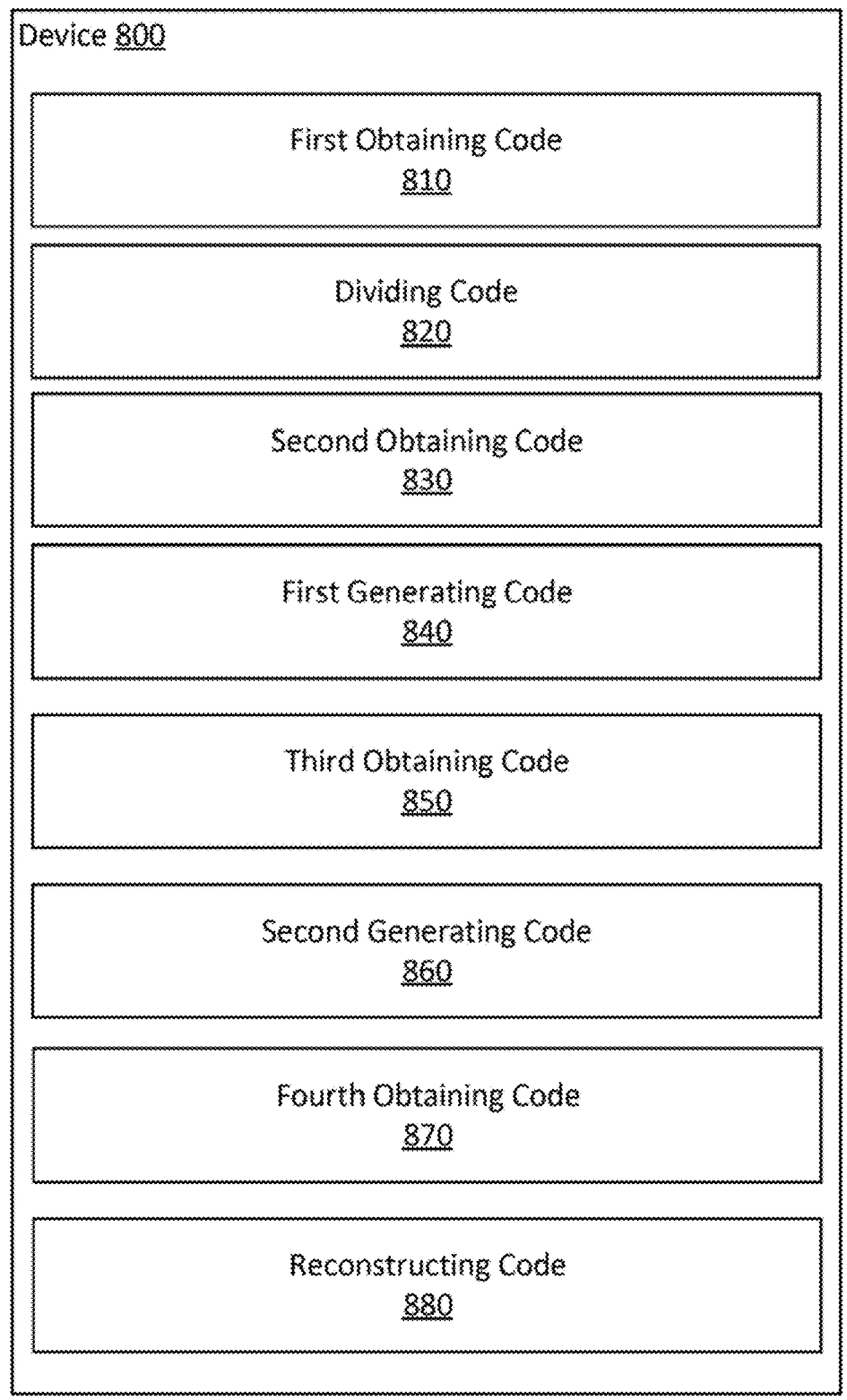
FIG. 8 is a diagram illustrating a device in accordance with an embodiment.

FIG. 8 is a diagram of an apparatus 800 for decoding a video stream encoded using video point cloud coding which may include annealing iterative geometry smoothing, according to embodiments. As shown in FIG. 8, the apparatus 800 includes first obtaining code 810, dividing code 820, second obtaining code 830, first generating code 840, third obtaining code 850, second generating code 860, fourth obtaining code 870, and reconstructing code 880.

The first obtaining code 810 may be configured to cause the at least one processor to obtain a geometry-reconstructed point cloud.

The dividing code 820 may be configured to cause the at least one processor to divide the geometry-reconstructed point cloud into a plurality of cells, wherein a cell of the plurality of cells comprises a first plurality of points.

The second obtaining code 830 may be configured to cause the at least one processor to obtain, from among the first plurality of points, a first reference point comprising a centroid of the first plurality of points.

The first generating code 840 may be configured to cause the at least one processor to generate a second plurality of points by applying a first filter to the first plurality of points based on the first reference point.

The third obtaining code 850 may be configured to cause the at least one processor to obtain, from among the second plurality of points, a second reference point comprising a centroid of the second plurality of points.

The second generating code 860 may be configured to cause the at least one processor to generate a third plurality of points by applying a second filter to the second plurality of points based on the second reference point, wherein a strength of the first filter is higher than a strength of the second filter.

The fourth obtaining code 870 may be configured to cause the at least one processor to obtain a smoothed geometry-reconstructed point cloud based on the third plurality of points.

The reconstructing code 880 may be configured to cause the at least one processor to reconstruct a dynamic point cloud using the smoothed geometry-reconstructed point cloud.

The techniques, described above, can be implemented as computer software using computer-readable instructions and physically stored in one or more computer-readable media. For example, FIG. 9 shows a computer system 900 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
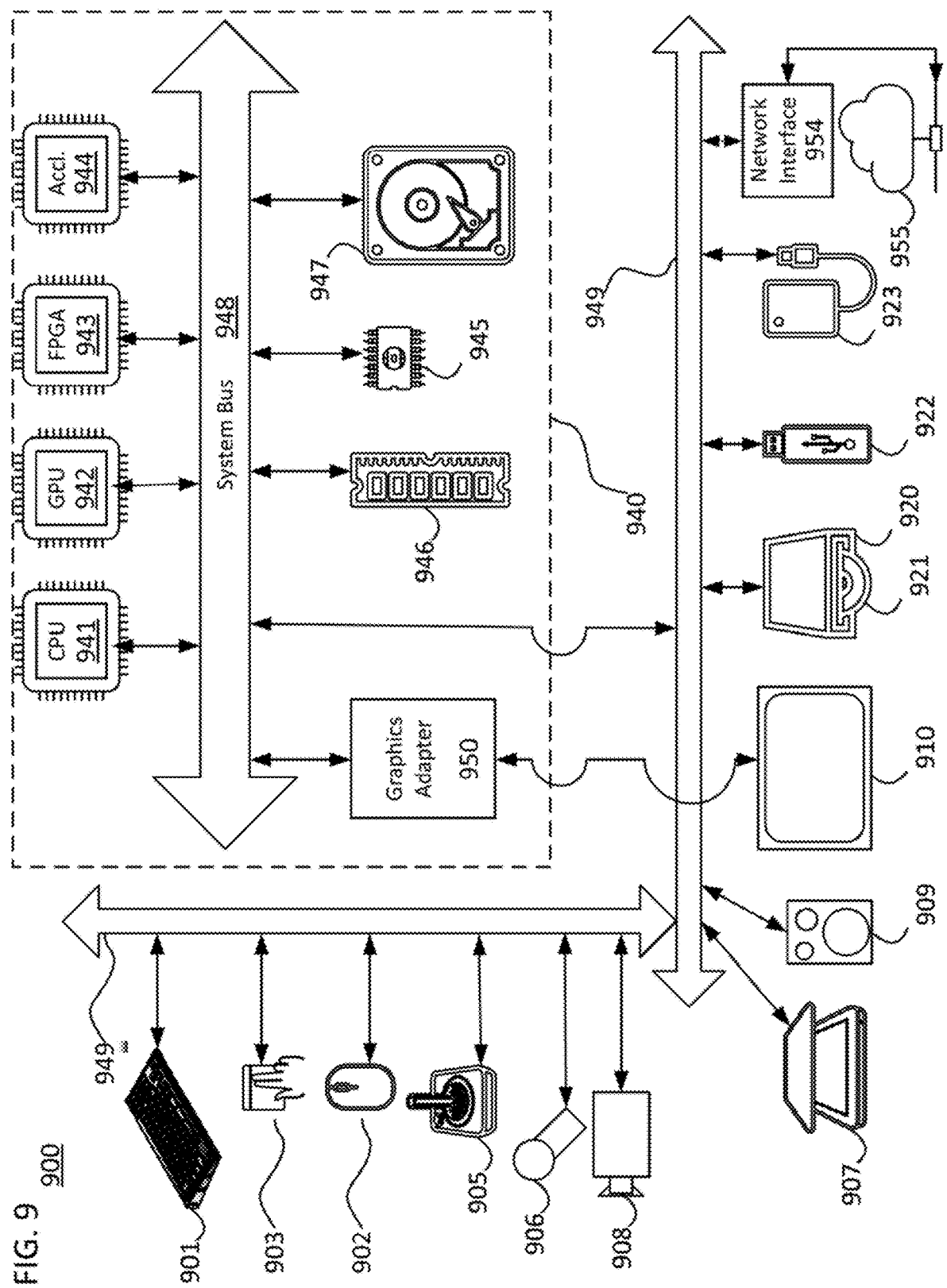
FIG. 9 is a diagram of a computer system suitable for implementing embodiments.

The components shown in FIG. 9 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claims is:

1. A method of decoding a video stream encoded using video point cloud coding, the method being performed by at least one processor and comprising:
   obtaining a geometry-reconstructed point cloud;
   dividing the geometry-reconstructed point cloud into a plurality of cells, wherein a cell of the plurality of cells comprises a first plurality of points;
   obtaining, from among the first plurality of points, a first reference point comprising a centroid of the first plurality of points;
   generating a second plurality of points by applying a first filter to the first plurality of points based on the first reference point;
   obtaining, from among the second plurality of points, a second reference point comprising a centroid of the second plurality of points;
   generating a third plurality of points by applying a second filter to the second plurality of points based on the second reference point;
   obtaining a smoothed geometry-reconstructed point cloud based on the third plurality of points; and
   reconstructing a dynamic point cloud using the smoothed geometry-reconstructed point cloud,
   wherein a strength of the first filter is lower than a strength of the second filter.

2. The method of claim 1, wherein the first filter comprises a first trilinear filter, and
   wherein the second filter comprises a second trilinear filter.

3. The method of claim 1, wherein the first filter is represented as follows:

$$p_1 \xrightarrow{move\ to} \tilde{p}_1$$

wherein $p_1$ represents a location of the first reference point, and $\tilde{p}_1$ represents a location of the first reference point after an interpolation filter is applied, and
wherein the second filter is represented as follows:

$$p_2 \xrightarrow{move\ to} w \cdot \tilde{p}_2 + (1-w) \cdot p_2$$

wherein $p_2$ represents a location of the second reference point, $\tilde{p}_2$ represents a location of the second reference point after the interpolation filter is applied, and w represents a filter weight.

4. The method of claim 1, further comprising:
   obtaining, from among the third plurality of points, a third reference point comprising a centroid of the third plurality of points;
   generating a fourth plurality of points by applying a third filter to the third plurality of points based on the third reference point;
   generating the smoothed geometry-reconstructed point cloud based on the fourth plurality of points.

5. The method of claim 4, wherein the first filter, the second filter, and the third filter are represented as follows:

$$p \xrightarrow{move\ to} \alpha_0 e^{-\beta_0 k} \cdot \tilde{p} + (1 - \alpha_0 e^{-\beta_0 k}) \cdot p$$

wherein p represents a location of a reference point, $\tilde{p}$ represents a location of the reference point after an interpolation filter is applied, $\alpha_0$ represents a first constant, $\beta_0$ represents a second constant, and k represents an iteration number, wherein k=1 for the first filter, k=2 for the second filter, and k=3 for the third filter.

6. The method of claim 4, wherein the first filter, the second filter, and the third filter are represented as follows:

$$p \xrightarrow{move\ to} \frac{\alpha_0}{1+\beta_0 k} \cdot \tilde{p} + \left(1 - \frac{\alpha_0}{1+\beta_0 k}\right) \cdot p$$

wherein p represents a location of a reference point, $\tilde{p}$ represents a location of the reference point after an interpolation filter is applied, $\alpha_0$ represents a first constant, $\beta_0$ represents a second constant, and k represents an iteration number, wherein k=1 for the first filter, k=2 for the second filter, and k=3 for the third filter.

7. The method of claim 1, further comprising:
comparing a number of the first plurality of points to a threshold value,
wherein, based on the number being lower than a threshold value, the centroid of the first plurality of points is determined using a vector median of the first plurality of points, and
wherein, based on the number being higher than the threshold value, the centroid of the first plurality of points is determined using an average filter.

8. The method of claim 1, wherein duplicate points are removed from the first plurality of points before the first reference point is determined.

9. The method of claim 8, wherein the centroid of the first plurality of points is determined as follows:

$$c = \frac{\sum_{p_i \in Q} p_i}{|Q|}$$

wherein c represents the centroid of the first plurality of points, Q represents a set of the first plurality of points after the duplicate points are removed, and $p_i$ represents a point of the first plurality of points having an index i.

10. The method of claim 1, wherein metadata of the video stream includes at least one from among an indication that smoothing is present in the video stream, an indication of a number of times the smoothing is applied, an indication of a type of reference point used in the smoothing, and an indication of a type of filter used in the smoothing.

11. An apparatus for decoding a video stream encoded using video point cloud coding, the apparatus comprising:
at least one memory configured to store program code; and
at least one processor configured to read the program code and operate as instructed by the program code, the program code comprising:
first obtaining code configured to cause the at least one processor to obtain a geometry-reconstructed point cloud;
dividing code configured to cause the at least one processor to divide the geometry-reconstructed point cloud into a plurality of cells, wherein a cell of the plurality of cells comprises a first plurality of points;
second obtaining code configured to cause the at least one processor to obtain, from among the first plurality of points, a first reference point comprising a centroid of the first plurality of points;
first generating code configured to cause the at least one processor to generate a second plurality of points by applying a first filter to the first plurality of points based on the first reference point;
third obtaining code configured to cause the at least one processor to obtain, from among the second plurality of points, a second reference point comprising a centroid of the second plurality of points;
second generating code configured to cause the at least one processor to generate a third plurality of points by applying a second filter to the second plurality of points based on the second reference point;
fourth obtaining code configured to cause the at least one processor to obtain a smoothed geometry-reconstructed point cloud based on the third plurality of points; and
reconstructing code configured to cause the at least one processor to reconstruct a dynamic point cloud using the smoothed geometry-reconstructed point cloud,
wherein a strength of the first filter is higher than a strength of the second filter.

12. The apparatus of claim 11, wherein the first filter comprises a first trilinear filter, and
wherein the second filter comprises a second trilinear filter.

13. The apparatus of claim 11, wherein the first filter is represented as follows:

$$p_1 \xrightarrow{move\ to} \tilde{p}_1$$

wherein $p_1$ represents a location of the first reference point, and $\tilde{p}_1$ represents a location of the first reference point after an interpolation filter is applied, and
wherein the second filter is represented as follows:

$$p_2 \xrightarrow{move\ to} w \cdot \tilde{p}_2 + (1-w) \cdot p_2$$

wherein $p_2$ represents a location of the second reference point, $\tilde{p}_2$ represents a location of the second reference point after the interpolation filter is applied, and w represents a filter weight.

14. The apparatus of claim 11, wherein the program code further comprises:
fifth obtaining code configured to cause the at least one processor to obtain, from among the third plurality of points, a third reference point comprising a centroid of the third plurality of points;
third generating code configured to cause the at least one processor to generate a fourth plurality of points by applying a third filter to the third plurality of points based on the third reference point;
sixth obtaining code configured to cause the at least one processor to obtain the smoothed geometry-reconstructed point cloud based on the fourth plurality of points.

15. The apparatus of claim 14, wherein the first filter, the second filter, and the third filter are represented as follows:

$$p \xrightarrow{move\ to} \alpha_0 e^{-\beta_0 k} \cdot \tilde{p} + (1 - \alpha_0 e^{-\beta_0 k}) \cdot p$$

wherein p represents a location of a reference point, $\tilde{p}$ represents a location of the reference point after an interpolation filter is applied, $\alpha_0$ represents a first constant, $\beta_0$ represents a second constant, and k represents an iteration number, wherein k=1 for the first filter, k=2 for the second filter, and k=3 for the third filter.

16. The apparatus of claim 14, wherein the first filter, the second filter, and the third filter are represented as follows:

$$p \xrightarrow{move\ to} \frac{\alpha_0}{1+\beta_0 k} \cdot \tilde{p} + \left(1 - \frac{\alpha_0}{1+\beta_0 k}\right) \cdot p$$

wherein p represents a location of a reference point, $\tilde{p}$ represents a location of the reference point after an interpolation filter is applied, $\alpha_0$ represents a first constant, $\beta_0$ represents a second constant, and k represents an iteration number, wherein k=1 for the first filter, k=2 for the second filter, and k=3 for the third filter.

17. The apparatus of claim 11, wherein duplicate points are removed from the first plurality of points before the first reference point is determined.

18. The apparatus of claim 17, wherein the centroid of the first plurality of points is determined as follows:

$$c = \frac{\Sigma_{p_i \in Q} p_i}{|Q|}$$

wherein c represents the centroid of the first plurality of points, Q represents a set of the first plurality of points after the duplicate points are removed, and $p_i$ represents a point of the first plurality of points having an index i.

19. The apparatus of claim 11, wherein metadata of the video stream includes at least one from among an indication that smoothing is present in the video stream, an indication of a number of times the smoothing is applied, an indication of a type of reference point used in the smoothing, and an indication of a type of filter used in the smoothing.

20. A non-transitory computer-readable medium storing computer instructions decoding a video stream encoded using video point cloud coding that, when executed by at least one processor, cause the at least one processor to:
  obtain a geometry-reconstructed point cloud;
  divide the geometry-reconstructed point cloud into a plurality of cells, wherein a cell of the plurality of cells comprises a first plurality of points;
  obtain, from among the first plurality of points, a first reference point comprising a centroid of the first plurality of points;
  generate a second plurality of points by applying a first filter to the first plurality of points based on the first reference point;
  obtain, from among the second plurality of points, a second reference point comprising a centroid of the second plurality of points;
  generate a third plurality of points by applying a second filter to the second plurality of points based on the second reference point;
  obtain a smoothed geometry-reconstructed point cloud based on the third plurality of points; and
  reconstruct a dynamic point cloud using the smoothed geometry-reconstructed point cloud,
  wherein a strength of the first filter is higher than a strength of the second filter.

* * * * *